(12) United States Patent
Kang et al.

(10) Patent No.: US 12,197,784 B2
(45) Date of Patent: Jan. 14, 2025

(54) STORAGE DEVICE SUPPORTING MULTI-HOST AND OPERATION METHOD THEREOF

(71) Applicant: SAMSUNG ELECTRONICS CO., LTD., Suwon-si (KR)

(72) Inventors: Yunseok Kang, Hwaseong-si (KR); Soo-Gon Kim, Seoul (KR); Jaesub Kim, Seoul (KR); Yangwoo Roh, Hwaseong-si (KR); Jeongbeom Seo, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 77 days.

(21) Appl. No.: 17/815,720

(22) Filed: Jul. 28, 2022

(65) Prior Publication Data

US 2023/0153031 A1 May 18, 2023

(30) Foreign Application Priority Data

Nov. 16, 2021 (KR) .......................... 10-2021-0157134
Feb. 15, 2022 (KR) .......................... 10-2022-0019425

(51) Int. Cl.
*G06F 13/38* (2006.01)
*G06F 3/06* (2006.01)

(52) U.S. Cl.
CPC .......... *G06F 3/0659* (2013.01); *G06F 3/0604* (2013.01); *G06F 3/0653* (2013.01); *G06F 3/0679* (2013.01)

(58) Field of Classification Search
CPC .... G06F 3/0659; G06F 3/0604; G06F 3/0653; G06F 3/0679
See application file for complete search history.

(56) References Cited

U.S. PATENT DOCUMENTS

| 7,685,342 | B2 | 3/2010 | Shiraki et al. |
| 7,849,167 | B2 | 12/2010 | McNutt et al. |
| 7,912,951 | B2 | 3/2011 | Gulati et al. |
| 9,794,292 | B2 * | 10/2017 | Hussain ................. H04L 41/28 |
| 10,592,107 | B2 * | 3/2020 | Alexeev ............... G06F 3/0604 |
| 10,866,910 | B2 * | 12/2020 | Benisty ............... G06F 13/1642 |

(Continued)

FOREIGN PATENT DOCUMENTS

| EP | 4047466 B1 * | 3/2024 | ........ G06F 13/1642 |
| KR | 10-2016-0016557 | 2/2016 | |
| KR | 10-2020-0056704 | 5/2020 | |

*Primary Examiner* — Cheng Yuan Tseng
(74) *Attorney, Agent, or Firm* — F. Chau & Associates, LLC

(57) ABSTRACT

Disclosed is an operation method of a storage device which includes setting a first threshold value for a first host and a second threshold value for a second host under control of a hypervisor, sequentially fetching host commands from the first and second hosts, storing the fetched host commands in an internal command queue, stopping fetching a host command from the first host when the number of first host commands fetched from the first host from among the host commands stored in the internal command queue reaches the first threshold value, and stopping fetching a host command from the second host when the number of second host commands fetched from the second host from among the host commands stored in the internal command queue reaches the second threshold value.

17 Claims, 10 Drawing Sheets

(56) References Cited

U.S. PATENT DOCUMENTS

| | | | |
|---|---|---|---|
| 11,074,013 B2* | 7/2021 | Suri | G06F 3/0607 |
| 11,126,584 B2* | 9/2021 | Nam | G06F 13/4282 |
| 11,886,364 B2* | 1/2024 | Bai | G06F 3/0683 |
| 2016/0188510 A1 | 6/2016 | Singh et al. | |
| 2020/0159439 A1 | 5/2020 | Hyung et al. | |
| 2021/0240393 A1 | 8/2021 | Jo et al. | |
| 2023/0153031 A1* | 5/2023 | Kang | G06F 3/0679 |
| | | | 711/154 |

* cited by examiner

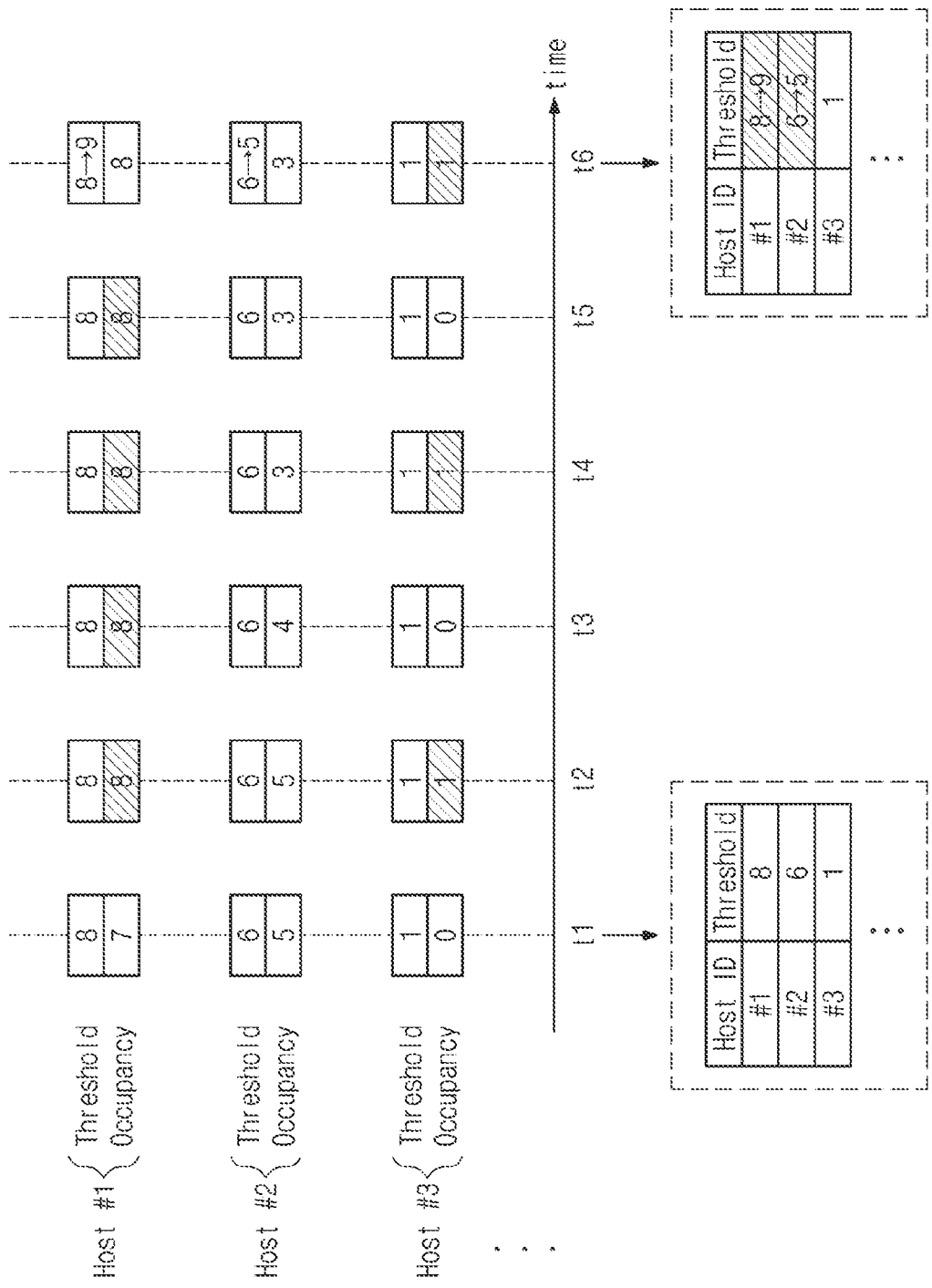

STORAGE DEVICE SUPPORTING MULTI-HOST AND OPERATION METHOD THEREOF

CROSS-REFERENCE TO RELATED APPLICATIONS

This U.S. non-provisional patent application claims priority under 35 U.S.C. § 119 to Korean Patent Application Nos. 10-2021-0157134 filed on Nov. 16, 2021, and 10-2022-0019425 filed on Feb. 15, 2022, in the Korean Intellectual Property Office, the disclosures of which are incorporated by reference in their entireties herein.

1. Technical Field

Embodiments of the present disclosure described herein relate to a storage device, and more particularly, relate to a storage device supporting a multi-host and an operation method thereof.

2. Discussion of Related Art

A semiconductor memory device may be a volatile memory or a nonvolatile memory. A volatile memory loses data stored therein when a power supply is turned off. Examples of a volatile memory include a dynamic random access memory (DRAM) and a static RAM (SRAM). A nonvolatile memory retains data stored therein even when a power supply is turned off. Examples of a nonvolatile memory include a flash memory, a phase-change RAM (PRAM), a magnetic RAM (MRAM), a resistive RAM (ReRAM), and a ferroelectric random access memory (FRAM).

A flash memory-based high-capacity storage medium may communicate with an external device using a high-speed interface. A storage system including the high-capacity storage medium may need to support a plurality of hosts. However, when several hosts access a single storage medium, performance is reduced due to the single storage medium having a limited amount of physical resources.

SUMMARY

Embodiments of the present disclosure provide a storage device capable of preventing a resource from being monopolized by a specific host and an operation method thereof.

According to an embodiment, an operation method of a storage device includes setting a first threshold value for a first host and a second threshold value for a second host under control of a hypervisor, sequentially fetching host commands from the first and second hosts, storing the fetched host commands in an internal command queue, stopping fetching a host command from the first host when the number of first host commands fetched from the first host from among the host commands stored in the internal command queue reaches the first threshold value, and stopping fetching a host command from the second host when the number of second host commands fetched from the second host from among the host commands stored in the internal command queue reaches the second threshold value.

According to an embodiment, a storage device includes a nonvolatile memory device, and a storage controller that controls the nonvolatile memory device based on first host commands issued from a first host and second host commands issued from a second host. The storage controller includes a command fetcher that sequentially fetches the issued first and second host commands, an internal command queue that stores first host commands fetched from the first host from among the issued host commands and second host commands fetched from the second host from among the issued host commands, and a performance manager. When the number of the first host commands stored in the internal command queue is more than or equal to a first threshold value, the performance manager controls the command fetcher such that a host command is not fetched from the first host. When the number of the second host commands stored in the internal command queue is more than or equal to a second threshold value, the performance manager controls the command fetcher such that a host command is not fetched from the second host.

According to an embodiment, a storage system includes a first host, a second host, a storage device that allocates a resource to the first host in response to a request of the first host and allocates the resource to the second host in response to a request of the second host, and a hypervisor that accesses the storage device to control the resource allocation to the first and second hosts. The storage device sets a first threshold value for an amount of the resource allocated to the first host and a second threshold value for an amount of the resource allocated to the second host under control of the hypervisor, stops the resource allocation to the first host when the amount of the resource allocated to the first host reaches the first threshold value, and stops the resource allocation to the second host when the amount of the resource allocated to the second host is greater than or equal to the second threshold value.

BRIEF DESCRIPTION OF THE FIGURES

The above and other objects and features of the present disclosure will become apparent by describing in detail embodiments thereof with reference to the accompanying drawings.

FIG. 6 is a diagram illustrating an operation of a storage device of FIG. 1.

DETAILED DESCRIPTION

Below, embodiments of the present disclosure will be described in detail and clearly to such an extent that one skilled in the art may implement these embodiments. In the following description, specific details such as detailed components and structures are merely provided to assist the overall understanding of embodiments of the present disclosure. Therefore, it should be apparent to those skilled in the art that various changes and modifications of the embodiments described herein may be made without departing from the scope and spirit of the disclosure. The terms described in the specification are terms defined in consideration of the functions in the present disclosure and are not limited to a specific function.

Components that are described in the detailed description with reference to the terms "circuit", "block", etc. may be implemented with software, hardware, or a combination thereof. For example, the software may be a machine code, firmware, an embedded code, and application software. For example, the hardware may include an electrical circuit, an electronic circuit, a processor, a computer, integrated circuit cores, a pressure sensor, an inertial sensor, a micro electro mechanical system (MEMS), a passive element, or a combination thereof.

Figure 1:
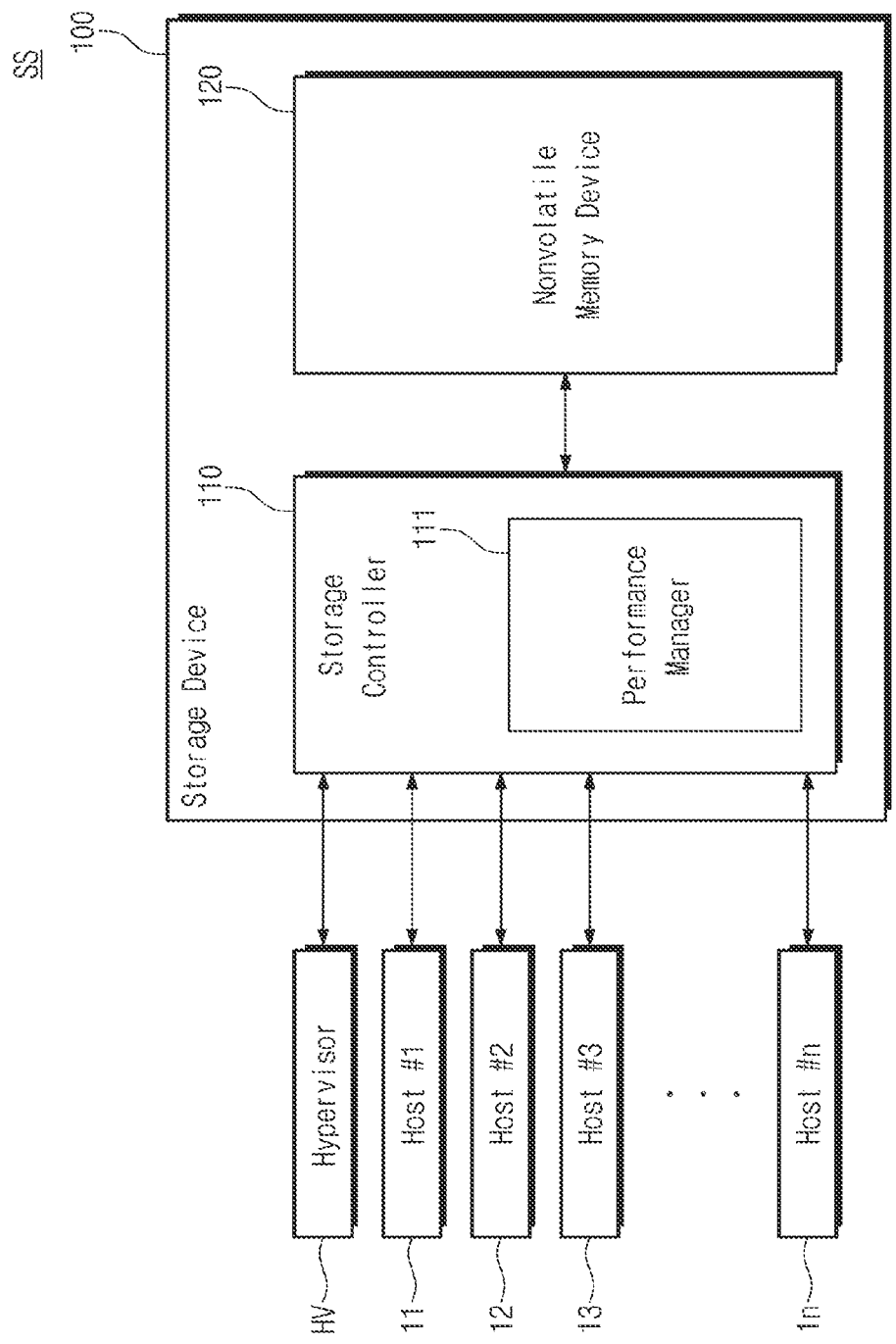
FIG. 1 is a block diagram illustrating a storage system according to an embodiment of the present disclosure.

FIG. 1 is a block diagram illustrating a storage system according to an embodiment of the present disclosure. Referring to FIG. 1, a storage system SS may include a hypervisor HV, a plurality of hosts 11 to 1n, and a storage device 100. In an embodiment, the storage system SS may be included in at least one of various information processing devices such as a personal computer (PC), a laptop computer, a server, a workstation, a smartphone, and a tablet PC.

Each of the hypervisor HV and the plurality of hosts 11 to 1n may access the storage device 100. In an embodiment, the hypervisor HV and the plurality of hosts 11 to 1n may be single or multi-core processors respectively included in different computing nodes. For example, the computing nodes could be located on a same computer or on different computers that communicate with one another using a computer network. Alternatively, at least some of the hypervisor HV and the plurality of hosts 11 to 1n may be different processors included in the same computing node. However, the present disclosure is not limited thereto. The hypervisor HV and the plurality of hosts 11 to 1n may be processors configured to process different applications or may be different virtual machines driven in a computing system. The hypervisor HV may run one or more virtual machines. A virtual machine may be a virtual environment that functions as virtual computer system with its own central processing unit (CPU), memory, network interface, and storage. The hypervisor HV may provision resources of a system to one or more of the virtual machines.

The storage device 100 may include a storage controller 110 (e.g., a controller circuit) and a nonvolatile memory device 120. The storage device 100 may be configured to support a multi-host (e.g., multiple hosts) or a multi-tenant (e.g., multiple tenants). That is, the storage device 100 may operate under control of a plurality of hosts. For example, based on commands issued from the hypervisor HV and the plurality of hosts 11 to 1n, the storage controller 110 may store data in the nonvolatile memory device 120 or may read data from the nonvolatile memory device 120.

In an embodiment, the storage device 100 may communicate with the hypervisor HV and the plurality of hosts 11 to 1n based on a PCI-express (Peripheral Component Interconnect express) interface or a PCI-express based NVMe (Nonvolatile Memory Express) interface.

The storage device 100 may allocate a resource in response to a request from each of the plurality of hosts 11 to 1n. For example, the storage controller 110 may allocate resources of the same size or different sizes to the first to n-th hosts 11 to 1n, respectively. In an embodiment, a resource may include at least one of a nonvolatile memory space of the storage device 100, a volatile memory space of the storage device 100, and an internal command queue capacity of the storage device 100. For example, the resource may include one or more command queues of the storage device 100 or slots of a given one of the command queues. For brevity of description, below, the expression "allocation of a resource to a specific host" may be interpreted as a resource that is occupied by the specific host. For example, a resource that is allocated to the first host 11 may be referred to as a resource that the first host 11 occupies.

The storage controller 110 may include a performance manager 111. The performance manager 111 may manage the allocation of resources to the first to n-th hosts 11 to 1n. For example, the performance manager 111 may appropriately allocate a resource to each of the first to n-th hosts 11 to 1n such that the quality of service required by each of the first to n-th hosts 11 to 1n is satisfied. Each of the first to n-th hosts 11 to 1n may have different quality of service requirements. For example, if a first host has a higher quality of service (QoS) requirement than a second host, then the first host may need more of the resources than the second host to satisfy its higher QoS.

In an embodiment, the hypervisor HV controls the allocation of resources to the first to n-th hosts 11 to 1n. The performance manager 111 may set a threshold value for the amount of resource to be allocated to each of the first to n-th hosts 11 to 1n under control of the hypervisor HV. That is, the performance manager 111 may set a resource occupancy threshold for each of the first to n-th hosts 11 to 1n. For example, the performance manager 111 may set a threshold value of a resource occupancy ratio for each of the first to n-th hosts 11 to 1n. Alternatively, the performance manager 111 may set a threshold value for the amount of resource that each of the first to n-th hosts 11 to 1n occupies.

In an embodiment, the performance manager 111 may stop the allocation of a resource to a host, in which an allocated resource amount reaches a corresponding threshold value, from among the first to n-th hosts 11 to 1n. For example, when the amount of resource allocated to the first host 11 reaches a first threshold value, the performance manager 111 may stop the additional allocation of a resource to the first host 11. That is, the performance manager 111 may temporarily stop the allocation of a resource to the first host 11 until the amount of resource allocated to the first host 11 decreases to less than the first threshold value or equal to the first threshold value. For example, if the first threshold value is 5, the first host 11 is already receiving 5 resources, and the first host 11 just requested a sixth resource, the performance manager 111 will not allocate the sixth resource to the first host 11.

In an embodiment, the hypervisor HV is configured request information about a resource occupancy threshold of each of the first to n-th hosts 11 to 1n.

In an embodiment, the hypervisor HV is configured to request changing a resource occupancy threshold of each or one or more of the first to n-th hosts 11 to 1n. How the storage device 100 operates in response to a request of the hypervisor HV will be described in detail with reference to FIGS. 5A, 5B, and 7A to 7C. In an embodiment, since a resource occupancy threshold is set for each of the first to n-th hosts 11 to 1n, a resource may be prevented from being monopolized by one or more of the hosts. A configuration and an operation of the performance manager 111 will be described in detail with reference to the following drawings.

Figure 2:
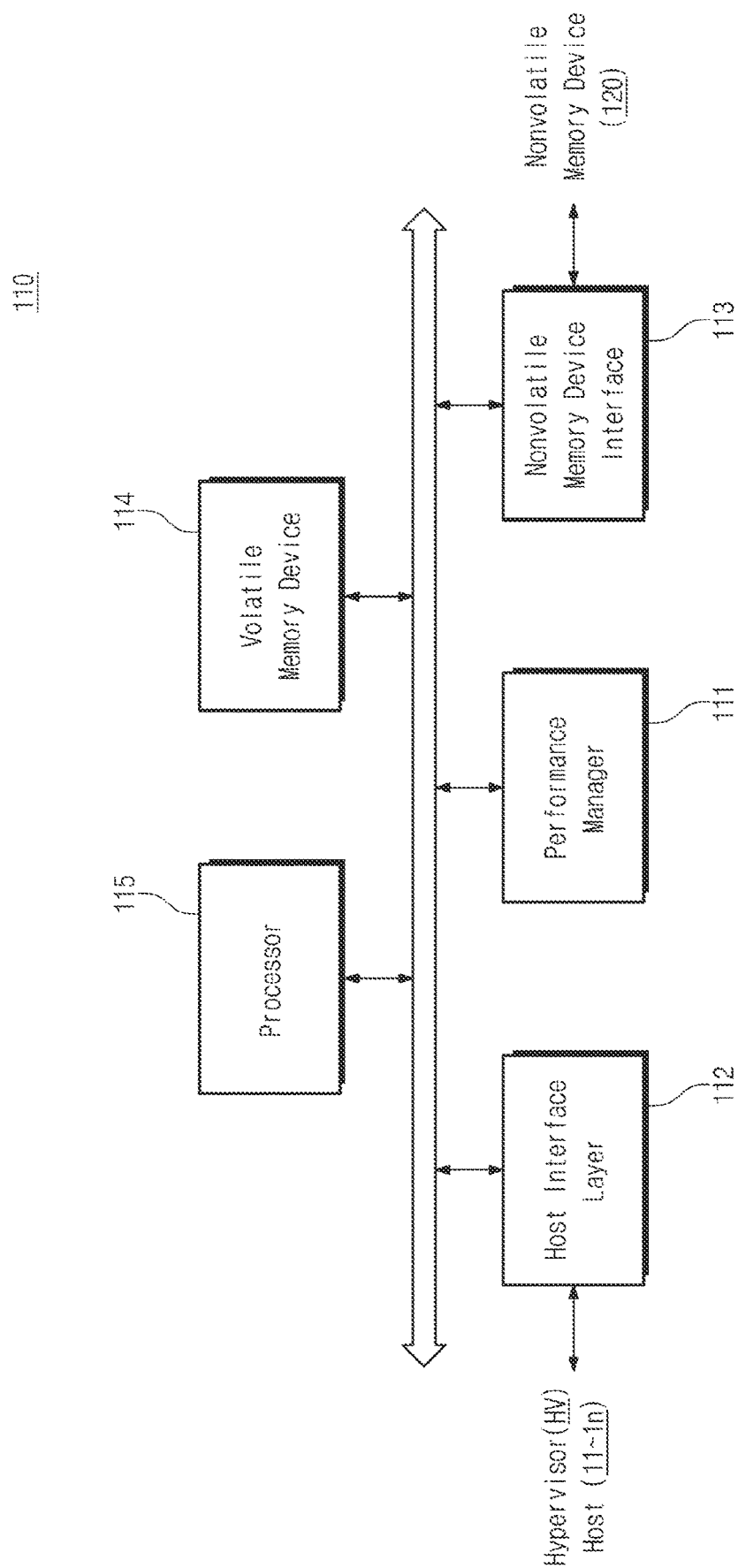
FIG. 2 is a block diagram illustrating a storage controller of FIG. 1 in detail.

FIG. 2 is a block diagram illustrating a storage controller of FIG. 1 in detail according to an example embodiment. Referring to FIGS. 1 and 2, the storage controller 110 may include the performance manager 111, a host interface layer 112 (e.g., an interface circuit), a nonvolatile memory device interface 113, a volatile memory device 114, and a processor 115. The performance manager 111, the host interface layer 112, the nonvolatile memory device interface 113, the volatile memory device 114, and the processor 115 may be connected with each other through a bus.

The storage controller 110 may communicate with the hypervisor HV and the first to n-th hosts 11 to 1n through the host interface layer 112. In an embodiment, the host interface layer 112 may include at least one of various host interfaces such as a PCI-express (Peripheral Component Interconnect express) interface, an NVMe (nonvolatile memory express) interface, a SATA (Serial ATA) interface, a SAS (Serial Attached SCSI) interface, and a UFS (Universal Flash Storage) interface. For brevity of description, below, it is assumed that the host interface layer 112 communicates with the hypervisor HV and the first to n-th hosts 11 to 1n based on the PCI-express interface.

In an embodiment, the host interface layer 112 is configured to fetch a command from each of the hypervisor HV and the first to n-th hosts 11 to 1n. In this embodiment, the fetched command may be stored in an internal command queue (i.e., may be enqueued). Below, for brevity of description, a command issued from the first to n-th hosts 11 to 1n may be referred to as a "host command". For example, internal command queue may be located within the storage device 100.

The storage controller 110 may communicate with the nonvolatile memory device 120 through the nonvolatile memory device interface 113 (e.g., an interface circuit). For example, the nonvolatile memory device interface 113 may be a NAND interface. In an embodiment, a memory space of the nonvolatile memory device 120 may be allocated to the first to n-th hosts 11 to 1n under control of the performance manager 111. In this embodiment, each of the first to n-th hosts 11 to 1n may occupy a nonvolatile memory space allocated thereto.

The volatile memory device 114 may be used as a working memory, a buffer memory, or a cache memory of the storage controller 110. For example, the volatile memory device 114 may be implemented with a static random access memory (SRAM) or a dynamic random access memory (DRAM). In an embodiment, a memory space of the volatile memory device 114 may be allocated to the first to n-th hosts 11 to 1n under control of the performance manager 111. In this embodiment, each of the first to n-th hosts 11 to 1n may occupy a volatile memory space allocated thereto.

The processor 115 may control an overall operation of the storage controller 110. For example, the processor 115 may execute various applications (e.g., a flash translation layer (FTL)) on the storage controller 110.

The performance manager 111 may manage the allocation of resources to the first to n-th hosts 11 to 1n. For example, the performance manager 111 may allocate at least one of the internal command queue, the volatile memory space, and the nonvolatile memory space. Below, an embodiment in which the performance manager 111 allocates the internal command queue (not illustrated) will be described. However, the present disclosure is not limited thereto. For example, the performance manager 111 may manage the allocation of at least one or more of various resources, such as the internal command queue, the volatile memory space, and the nonvolatile memory space, to each of the first to n-th hosts 11 to 1n.

In an embodiment, the performance manager 111 may be implemented in the form of hardware, software, or a combination thereof. For example, at least a part of the performance manager 111 may be included in the storage controller 110 in the form of a separate circuit, device, or chip. Also, at least a part of the performance manager 111 may be implemented in the form of a software module that is loaded to the volatile memory device 114 by the processor 115. That is, for brevity of description, the performance manager 111 is illustrated in FIG. 2 as a separate component, but all or some of the above functions of the performance manager 111 may be implemented (or included) in one or more of any other components.

Figure 3:
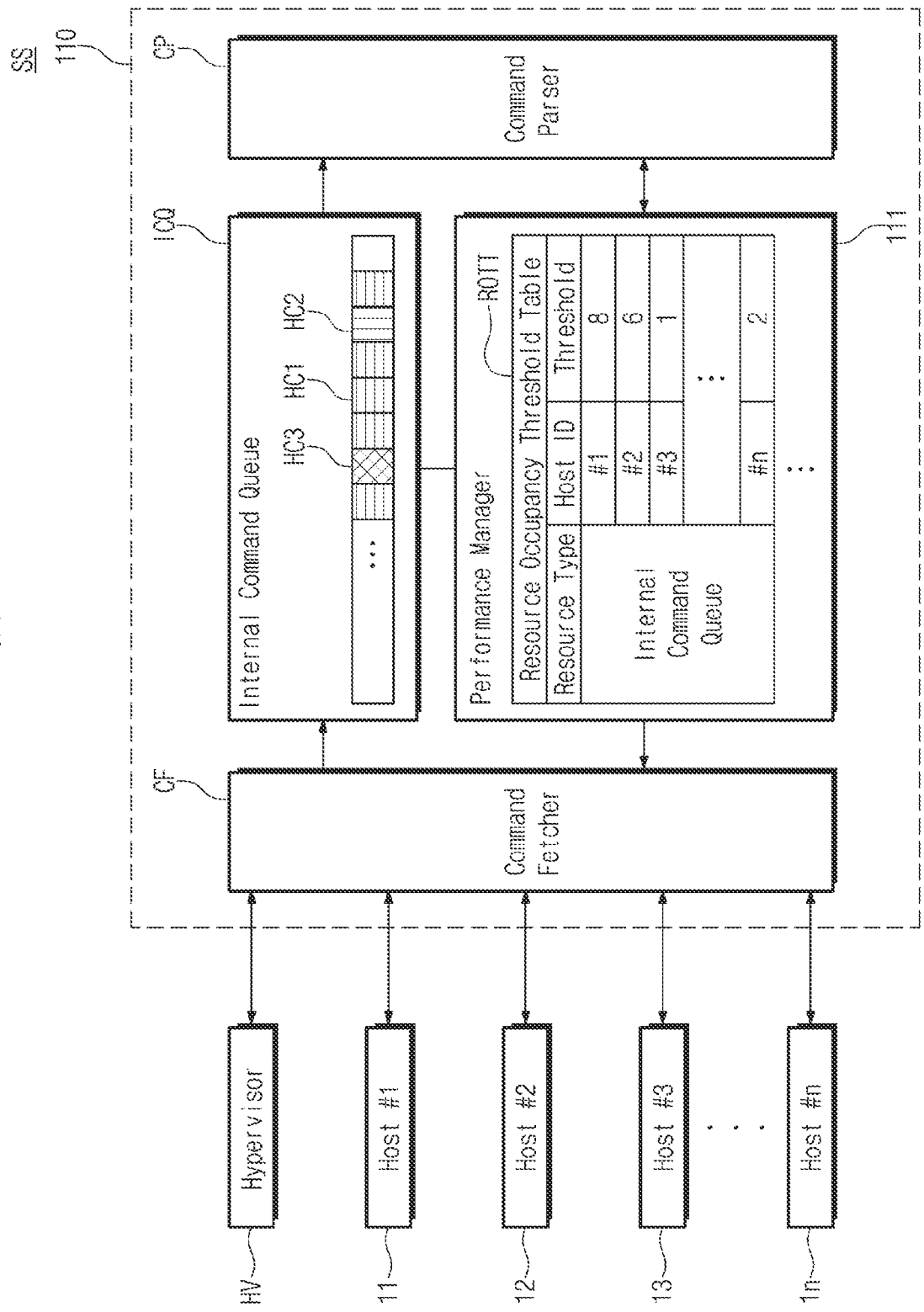
FIG. 3 is a block diagram for describing an operation of a storage system according to an embodiment of the present disclosure.

FIG. 3 is a block diagram for describing an operation of a storage system according to an embodiment of the present disclosure. Referring to FIGS. 1 to 3, the storage system SS may include the hypervisor HV, the first to n-th hosts 11 to 1n, and the storage controller 110. The storage controller 110 may include a command fetcher CF, an internal command queue ICQ, the performance manager 111, and a command parser CP. For brevity of description, the hypervisor HV and the first to n-th hosts 11 to 1n are described above, and thus, additional description will be omitted to avoid redundancy.

In an embodiment, the command fetcher CF and the internal command queue ICQ are included in the host interface layer 112.

The command fetcher CF may fetch commands issued from the hypervisor HV and the first to n-th hosts 11 to 1n. That is, the command fetcher CF may fetch a command from a submission queue of each of the hypervisor HV and the first to n-th hosts 11 to 1n. The command fetcher CF may provide the internal command queue ICQ with the commands (i.e., host commands) fetched from the first to n-th hosts 11 to 1n.

The internal command queue ICQ may store the fetched host commands. In an embodiment, among the host commands stored in the internal command queue ICQ, host commands fetched from the first host 11 may be referred to as "first host commands HC1" (marked by a horizontal stripe), host commands fetched from the second host 12 may be referred to as "second host commands HC2" (marked by a vertical stripe), and host commands fetched from the third host 13 may be referred to as "third host commands HC3" (marked by a cross stripe). As in the above description, host commands fetched from the n-th host 1n may be referred to as "n-th host commands HCn".

In an embodiment, a capacity of the internal command queue ICQ may be restricted. That is, the number of host commands capable of being stored in the internal command queue ICQ may be restricted to a certain amount. Below, for descriptive convenience, it is assumed that a maximum of 20 host commands are capable of being stored in the internal command queue ICQ. However, the present disclosure is not limited thereto.

The command parser CP may parse host commands stored in the internal command queue ICQ. For example, the command parser CP may process the host commands stored in the internal command queue ICQ in a first-in first-out (FIFO) manner. However, the present disclosure is not limited thereto. For example, the command parser CP may process the stored host commands based on various manners determined in compliance with an internal policy of the storage device 100.

The performance manager 111 may monitor a status of the internal command queue ICQ. For example, the performance manager 111 may monitor the total number of commands stored the internal command queue ICQ. Alternatively, the performance manager 111 may monitor the number of host commands corresponding to each of the first to n-th hosts 11 to 1n from the internal command queue ICQ. For example, the performance manager 111 may determine which of the host commands currently stored in the internal command queue ICQ correspond to each of the first to n-th hosts 11 to 1n and generate corresponding counts.

The performance manager 111 may control the command fetcher CF based on a monitoring result. For example, the performance manager 111 may generate the monitoring result from monitoring the number of the host commands. The command fetcher CF may fetch a host command from one of the first to n-th hosts 11 to 1n under control of the performance manager 111.

In an embodiment, in the case where the internal command queue ICQ is full, that is, 20 host commands are stored in the internal command queue ICQ, the performance manager 111 may determine to stop fetching commands from all the hosts 11 to 1n. For example, the performance manager 111 may determine to stop fetching commands until the number of host commands stored in the internal command queue ICQ decreases to less than 20 (i.e., until at least some of the stored commands are processed). The command fetcher CF may stop fetching host commands from the first to n-th hosts 11 to 1n in response to the determination of the performance manager 111.

The performance manager 111 may set a resource occupancy threshold for each of the first to n-th hosts 11 to 1n. For example, the performance manager 111 may set an internal command queue occupancy threshold for each of the first to n-th hosts 11 to 1n. That is, the performance manager 111 may set first to n-th threshold values to the numbers of first to n-th host commands HC1 to HCn, respectively. Below, for brevity of description, it is assumed that the first threshold value is "8", the second threshold value is "6", and the third threshold value is "1", but the present disclosure is not limited thereto. In an embodiment, the performance manager 111 set the internal command queue occupancy thresholds based on the individual and possibly different QoS requirements of each of the first to n-th hosts 11 to 1n. For example, these QoS requirements could be initially stored in the storage device 100 or sent to the storage device 100 from each of the hosts.

For example, the first to n-th threshold values may refer to internal command queue occupancy thresholds respectively corresponding to the first to n-th hosts 11 to 1n. That is, the first to n-th threshold values may refer to threshold values respectively associated with the numbers of first to n-th host commands HC1 to HCn stored in the internal command queue ICQ. As in the above description, the first to n-th threshold values may refer to various resource occupancy thresholds respectively corresponding to the first to n-th hosts 11 to 1n.

In an embodiment, the performance manager 111 may include a resource occupancy threshold table ROTT. The resource occupancy threshold table ROTT may store resource occupancy thresholds (e.g., internal command queue occupancy thresholds) of the first to n-th hosts 11 to 1n. Below, the description will be provided assuming the resource occupancy threshold table ROTT stores internal command queue occupancy thresholds respectively corresponding to the first to n-th hosts 11 to 1n. However, the present disclosure is not limited thereto. For example, the resource occupancy threshold table ROTT may store various resource occupancy thresholds such as a volatile memory space occupancy threshold, a nonvolatile memory space occupancy threshold, and an internal command queue occupancy threshold corresponding to each host.

For example, the resource occupancy threshold table ROTT may store threshold values respectively associated with the numbers of first to n-th host commands HC1 to HCn stored in the internal command queue ICQ. That is, the resource occupancy threshold table ROTT may store the first threshold value (e.g., 8) for the first host 11, the second threshold value (e.g., 6) for the second host 12, and the third threshold value (e.g., 1) for the third host 13.

The performance manager 111 may determine whether to fetch a command from each host based on the set threshold value. For example, when the number of first host commands HC1 stored in the internal command queue ICQ is more than or equal to the first threshold value (e.g., 8) (i.e., in the case where the number of first host commands HC1 reaches the first threshold value), the performance manager 111 may determine to stop fetching a command from the first host 11. In this case, the command fetcher CF may stop fetching host commands from the first host 11 in response to the determination of the performance manager 111. Operations that the performance manager 111 and the command fetcher CF perform based on the second to n-th threshold values are similar to those described above, and thus, additional description will be omitted to avoid redundancy. In an embodiment, each of the hosts has its own unique host identifier (ID) and the resource occupancy threshold table ROTT include an entry for each of the host IDs that indicates a threshold value for a corresponding host.

The internal command queue ICQ may be monopolized by a specific host. For example, 20 first host commands HC1 may be stored in the internal command queue ICQ. In this case, because host commands are not fetched from the remaining hosts (i.e., the second to n-th hosts 12 to 1n), the quality of service (QoS) perceived by the remaining hosts may decrease.

However, embodiments of the present disclosure may prevent the internal command queue ICQ from being monopolized. An upper limit of the amount of resource that each host occupies the internal command queue ICQ may be restricted by the performance manager 111. For example, in the case where the number of first host commands HC1 is restricted to a maximum of 8, the internal command queue ICQ may be prevented from being monopolized by the first host 11.

In an embodiment, the hypervisor HV may issue various types of commands. Commands that the hypervisor HV issues will be described in detail with reference to FIGS. 5A and 5B.

In an embodiment, the performance manager 111 is configured to dynamically update the threshold values of the hosts. An embodiment in which threshold values are dynamically updated will be described in detail with reference to FIG. 6.

Figure 4:
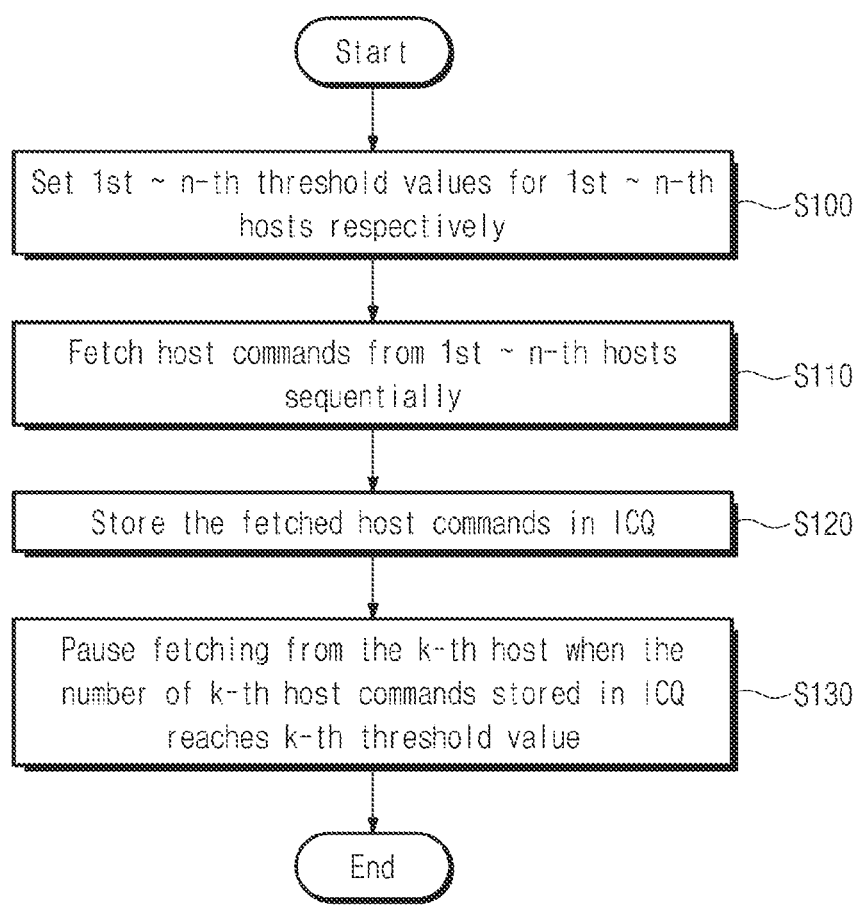
FIG. 4 is a flowchart illustrating an operation of a storage device of FIG. 3.

FIG. 4 is a flowchart illustrating an operation of a storage device of FIG. 3 according to an example embodiment. Referring to FIGS. 3 and 4, in operation S100, the storage device 100 sets the first to n-th threshold values of the first to n-th hosts 11 to 1n.

In an embodiment, the storage device 100 sets a threshold value for each of the first to n-th hosts 11 to 1n, under control of the hypervisor HV. For example, the storage device 100 may set the first to n-th threshold values for the first to n-th hosts 11 to 1n, respectively, based on a command issued from the hypervisor HV. For example, a command may be output from the hypervisor HV to the storage device 100 that includes a host ID of one of the hosts and a threshold value for the one host.

In operation S110, the storage device 100 sequentially fetches host commands from the first to n-th hosts 11 to 1n. For example, the command fetcher CF may sequentially fetch host commands from the first to n-th hosts 11 to 1n. For example, the storage device 100 could fetch a host command from the first host 11 and then fetch a host command from the second host 12 or vice versa.

In an embodiment, an order in which the command fetcher CF fetches host commands from the first to n-th hosts 11 to 1n may be determined based on a round robin or weighted round robin manner. For example, when round robin is used, a single command or a same number of commands could be fetched in turn sequentially from each of the first to n-th hosts 11 to 1n and after a command is fetched from the last host 1n, the next fetch would be with respect to the first host 11. For example, when weighted round robin is used, more commands may be fetched from certain hosts such as those having a higher QoS requirement. For example, if the first host 11 has a higher QoS requirement than the other hosts, two commands could be fetched from the first host 11 and then one command could be next fetched in turn sequentially from each of hosts 12 to 1n, and the process may be repeated by again fetching two commands from the first host 11.

In operation S120, the storage device 100 stores the fetched host commands in the internal command queue ICQ. For example, the command fetcher CF may provide the internal command queue ICQ with the host commands fetched from the first to n-th hosts 11 to 1n. The internal command queue ICQ may store the first to n-th host commands HC1 to HCn.

In operation S130, the storage device 100 stops (or pauses) fetching a command from a host corresponding to host commands which are stored in the internal command queue ICQ with greater or equal number to a threshold value. That is, when the number of k-th host commands HCk (k being an integer of 1 or more and n or less) stored in the internal command queue ICQ is more than or equal to the k-th threshold value, the storage device 100 may stop fetching a command from the k-th host 1k. Accordingly, the internal command queue ICQ may be prevented from being monopolized by the k-th host 1k. For example, if the threshold value of the first host 11 is 5 and there are already 5 or more host commands in the internal command queue ICQ from the host 11, even though the command fetcher CF is scheduled to next fetch another command from the host 11, the command fetcher CF skips this next fetch.

In an embodiment, a threshold value for the number of host commands may be set or changed under control of the hypervisor HV.

In an embodiment, a threshold value for the number of host commands is dynamically updated by the storage device 100. For example, the storage device 100 may appropriately change the set threshold values even though a separate command is not issued from the hypervisor HV. For example, the storage device 100 may change threshold values of one or more of the hosts, independently from the hypervisor HV. An operation in which a threshold value is dynamically updated by the storage device 100 will be described in detail with reference to FIG. 6.

Figure 5A:
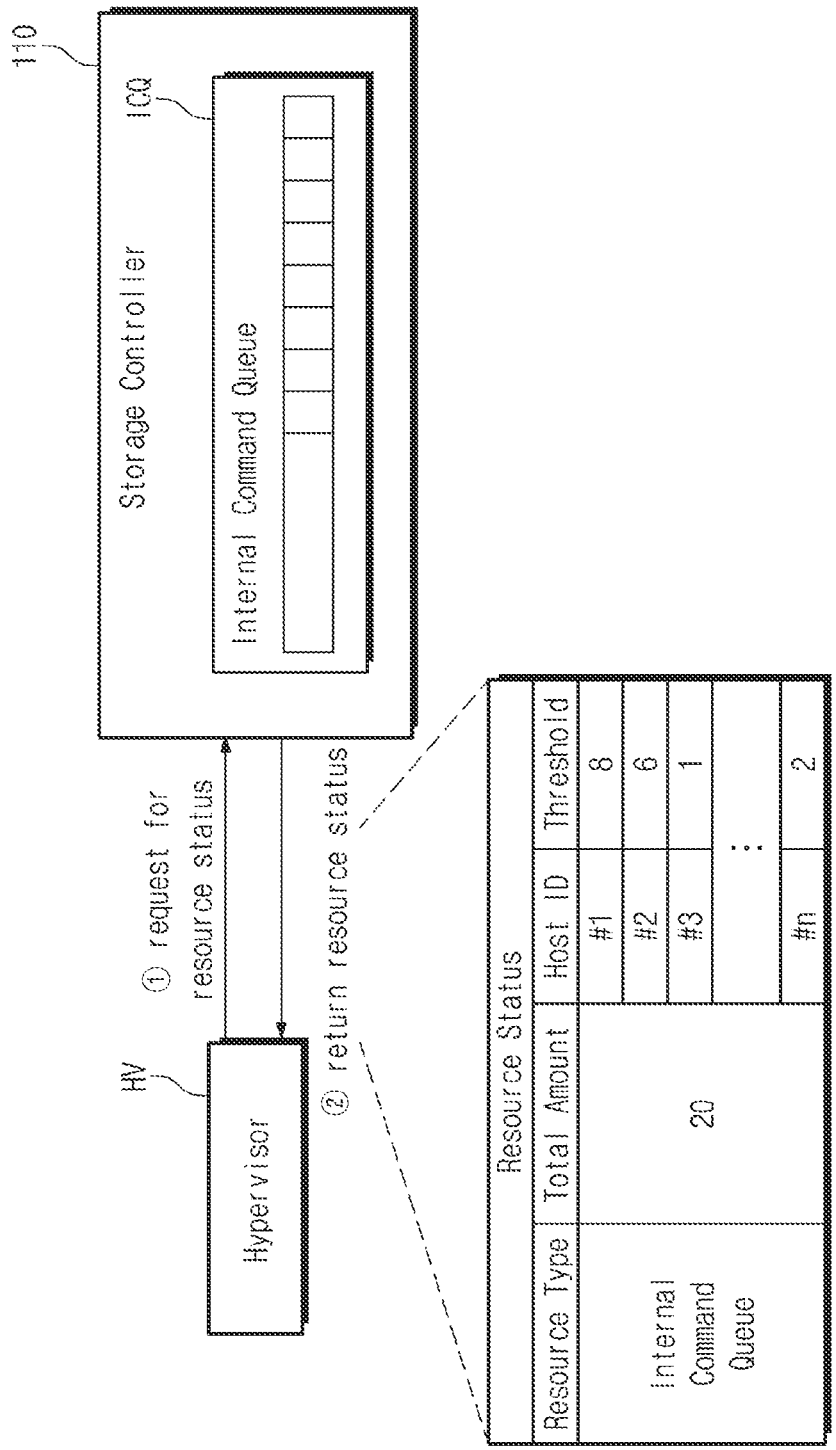
FIGS. 5A and 5B are block diagrams illustrating how a storage controller operates in response to a request of a hypervisor of FIG. 3.
Figure 5B:
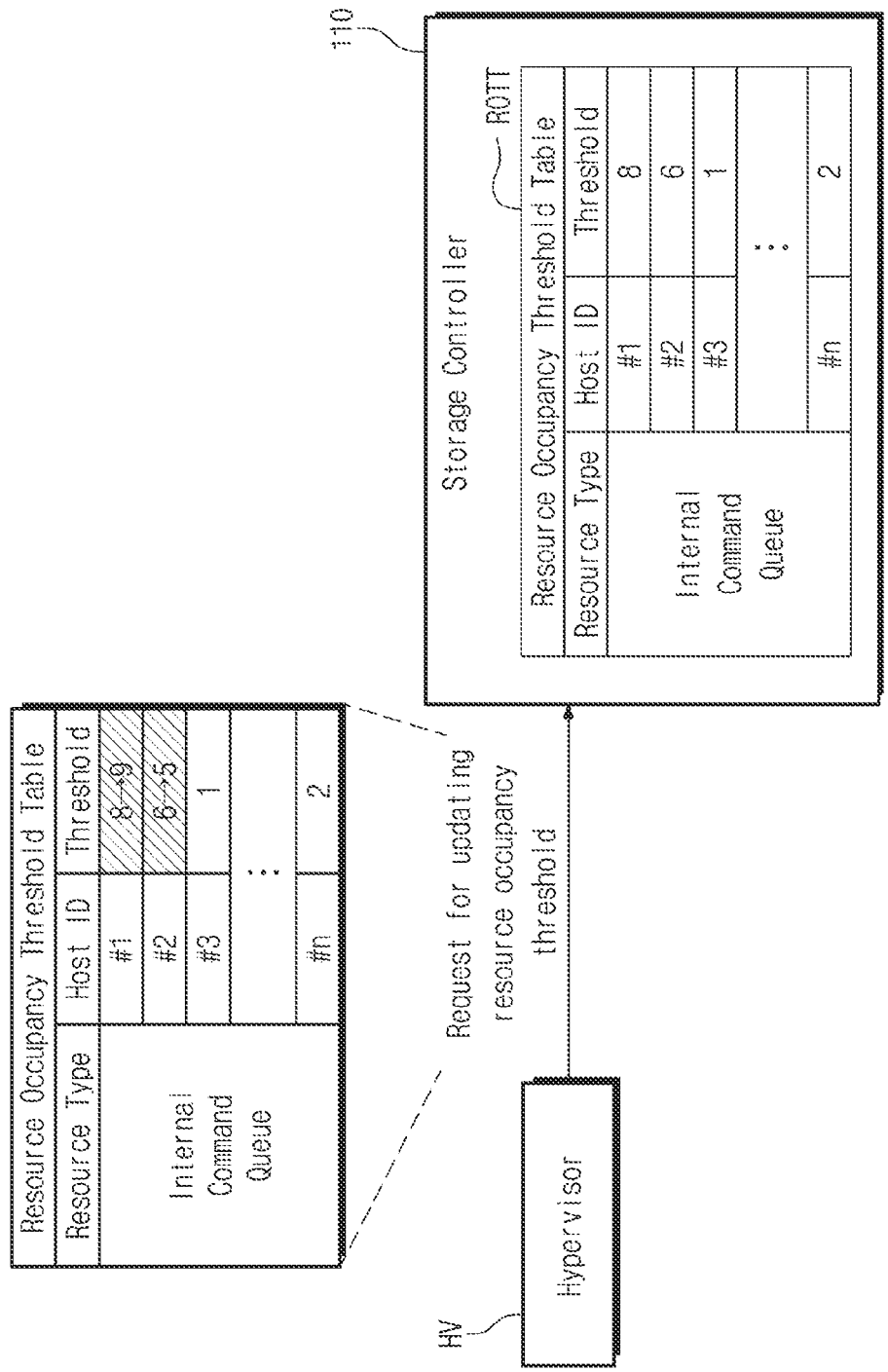

FIGS. 5A and 5B are block diagrams illustrating how a storage controller operates in response to a request of a hypervisor of FIG. 3.

Referring to FIGS. 3 and 5A, the hypervisor HV may request resource status information from the storage controller 110. For example, the hypervisor HV may issue a command for requesting the resource status information of the storage controller 110.

In an embodiment, in the case where the hypervisor HV and the storage controller 110 communicate based on the PCI-express interface, the request of the hypervisor HV may be implemented with a "get features" command.

The storage controller 110 may return the resource status information in response to the request of the hypervisor HV.

For example, the storage controller 110 (in more detail, the command fetcher CF) may fetch the command issued by the hypervisor HV. The storage controller 110 may return the resource status information in response to the fetched command. For example, the hypervisor HV may issue a command for requesting the resource status information, the storage controller 110 may fetch the issued command, the storage controller 110 may execute the fetched command to determine which one of the hosts to provide the resource status information for, and the storage controller 110 may provide the corresponding resource status information to the hypervisor HV.

In an embodiment, the storage controller 110 may return, to the hypervisor HV, information about a total amount of the internal command queue ICQ and/or information about a threshold value allocated for each host. For example, the total amount may indicate how many total commands are stored in the internal command queue ICQ or the total amount of commands stored for each of the hosts in the internal command ICQ. However, the present disclosure is not limited thereto. For example, the storage controller 110 may further return information about occupancy thresholds and total amounts of various resources such as a nonvolatile memory space and a volatile memory space.

Referring to FIGS. 3 and 5B, the hypervisor HV may request the storage controller 110 to update resource occupancy threshold information. That is, the hypervisor HV may issue a command for requesting the storage controller 110 to update the resource occupancy threshold information. For example, the hypervisor HV may request the storage controller 110 to update the internal command queue occupancy threshold (i.e., the first threshold value) of the first host 11 so as to be changed to "9" and to update the internal command queue occupancy threshold (i.e., the second threshold value) of the second host 12 so as to be changed to "5". For example, the hypervisor HV may send a command to the storage controller 110 including the host ID of the first host 11 and a changed threshold value so that the storage controller 110 can update the corresponding host threshold value based on the received changed threshold value. For example, the hypervisor HV may send a command to the storage controller 110 including several tuples, where each tuple includes a host ID of a distinct one of the hosts and a changed threshold value so that the storage controller 110 can update the host threshold values of the corresponding hosts based on the received changed threshold values.

In an embodiment, in the case where the hypervisor HV and the storage controller 110 communicate based on the PCI-express interface, the request of the hypervisor HV may be implemented with a "set features" command.

The storage controller 110 may update the resource occupancy threshold in response to the request of the hypervisor HV. For example, the performance manager 111 may change the first threshold value to "9" and may change the second threshold value to "5".

FIG. 6 is a diagram illustrating an operation of a storage device of FIG. 1. An operation in which the performance manager 111 dynamically changes set resource occupancy thresholds will be described with reference to FIGS. 1, 3, and 6. For brevity of description, an operation in which internal command queue occupancy thresholds (i.e., the first to third threshold values) respectively corresponding to the first to third hosts 11 to 13 are dynamically changed will be described with reference to FIG. 6, but the present disclosure is not limited to a resource kind or the number of hosts.

The performance manager 111 may monitor an internal command queue occupancy status and an internal command queue occupancy threshold corresponding to a specific host. The performance manager 111 may change the set internal command queue occupancy threshold based on the internal command queue occupancy status and the internal command queue occupancy threshold monitored for each host. For example, at second to fifth time points t2 to t5, the performance manager 111 may monitor an amount by which each host occupies the internal command queue ICQ. However, the present disclosure is not limited to the number of time points when the performance manager 111 performs a monitoring operation.

In an embodiment, in the case where a specific host consistently occupies the internal command queue ICQ as much as the internal command queue occupancy threshold, the performance manager 111 may increase the set resource occupancy threshold. For example, if the host occupies the internal command queue ICQ as much as the internal command queue occupancy threshold by several consecutive time periods, the performance manager 111 may increase its resource occupancy threshold.

For example, at the first time point t1, the internal command queue occupancy threshold (e.g., the first threshold value) set for the first host 11 may be "8". For example, a maximum of 8 first host commands HC1 may be stored in the internal command queue ICQ.

During a time period from t2 to t5, the first host 11 may occupy the internal command queue ICQ as much as the first threshold value. For example, up to 8 first host commands HC1 (i.e., the maximum number of first host commands HC1) may be stored in the internal command queue ICQ.

In this case, at a sixth time point t6, the performance manager 111 increases a value of the internal command queue occupancy threshold (e.g., the first threshold value) for the first host 11 by "1".

In an embodiment, in the case where a state in which a specific host occupies a resource whose amount is smaller than the set resource occupancy threshold is maintained, the performance manager 111 may decrease the set resource occupancy threshold.

For example, at the first time point t1, the internal command queue occupancy threshold (e.g., the first threshold value) set for the second host 12 may be "6". That is, a maximum of 6 second host commands HC2 may be stored in the internal command queue ICQ.

However, during a time period from t2 to t5, the second host 12 may occupy the internal command queue ICQ to be less than the second threshold value. For example, the number of second host commands HC2 stored in the internal command queue ICQ may be "5" at the second time point t2, may be "4" at the third time point t3, and may be "3" at the fourth and fifth time points t4 and t5.

In this case, at the sixth time point t6, the performance manager 111 may decrease a value of the internal command queue occupancy threshold (e.g., the second threshold value) set for the second host 12 by "1".

In an embodiment, the performance manager 111 may maintain a resource occupancy threshold set for a specific host.

For example, at the first time point t1, the internal command queue occupancy threshold (e.g., the third threshold value) set for the third host 13 may be "1". That is, a maximum of one third host command HC3 may be stored in the internal command queue ICQ.

At the second and fourth time points t2 and t4, the third host 13 may occupy the internal command queue ICQ as much as the third threshold value. That is, at some time points among a plurality of monitoring time points, the third host 13 may occupy the internal command queue ICQ as much as the set threshold value.

At the third and fifth time points t3 and t5, the third host 13 may occupy the internal command queue ICQ to be less than the third threshold value. That is, at some time points among the plurality of monitoring time points, the third host 13 may occupy the internal command queue ICQ to be less than the set threshold value.

In this case, at the sixth time point t6, the performance manager 111 does not change a value of the internal command queue occupancy threshold (e.g., the third threshold value) set for the third host 13.

In an embodiment, the dynamic change described with reference to FIG. 6 may be performed without the intervention of the hypervisor HV. That is, the dynamic change may be automatically performed by the performance manager 111.

In an embodiment, when the performance manager 111 determines that the occupancy of a given host is at its threshold value or one below its threshold value for two or more consecutive time points, the performance manager 111 increases the threshold value for the given host by one or more. In an embodiment, when the performance manager 111 determines that the occupancy of a given host is one or two below its threshold value for two or more consecutive time points, the performance manager 111 decreases the threshold value for the given host by one or more.

For brevity of description, an embodiment in which a threshold value increases when there is maintained a state where a specific host occupies the internal command queue ICQ as much as a corresponding threshold value is illustrated in FIG. 6. However, the present disclosure is not limited thereto. For example, the performance manager 111 may change the resource occupancy threshold based on a ratio of a monitored resource occupancy threshold and a monitored resource occupancy amount. For example, the performance manager 111 may increase the resource occupancy threshold associated with a host in which a value obtained by dividing a resource occupancy amount by a resource occupancy threshold is consistently 0.9 or more. As in the above description, the performance manager 111 may decrease the resource occupancy threshold associated with a host in which a value obtained by dividing a resource occupancy amount by a resource occupancy threshold is consistently 0.3 or less.

Also, the operation in which the storage device 100 dynamically changes an occupancy threshold of the internal command queue ICQ is disclosed in FIG. 6, but the present disclosure is not limited thereto. For example, as in the above manner described with reference to FIG. 6, the storage device 100 may update various resource occupancy thresholds such as a volatile memory space occupancy threshold and a nonvolatile memory space occupancy threshold.

Figure 7A:
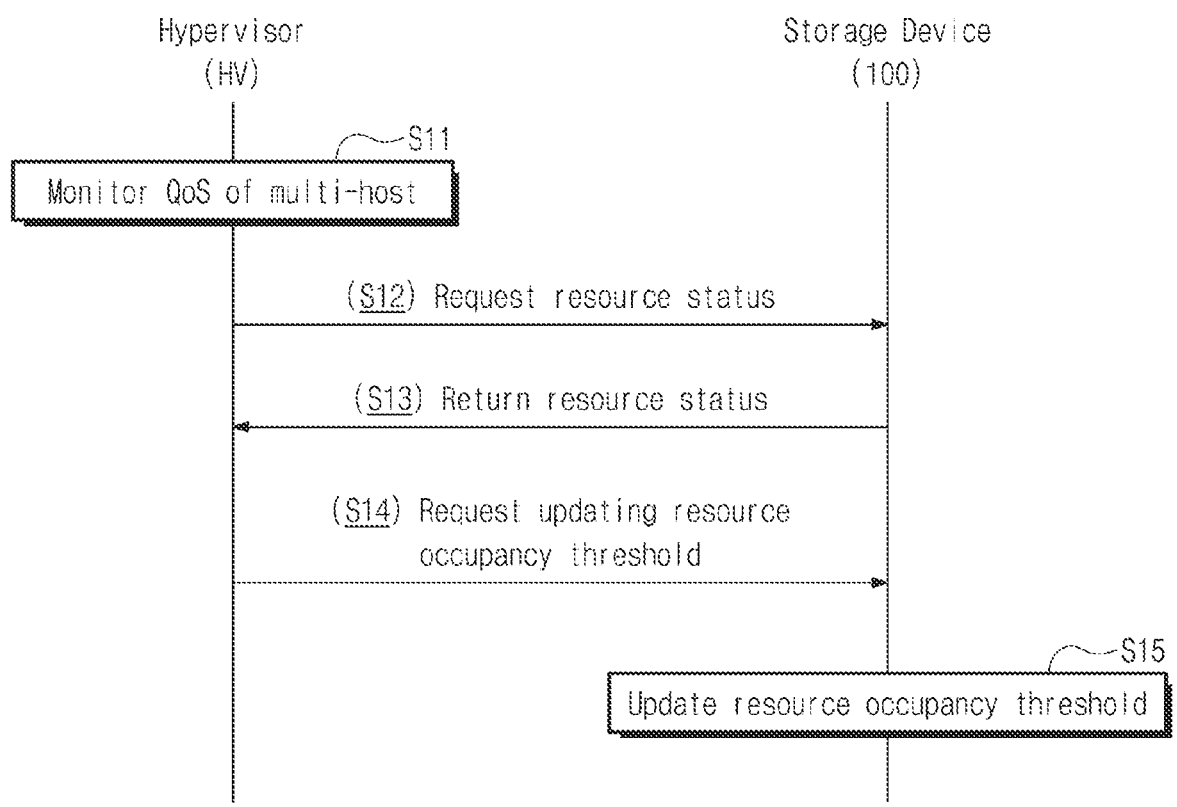
FIGS. 7A to 7C are flowcharts illustrating operations of a storage device changing a resource occupancy threshold according to an embodiment of the present disclosure.
Figure 7B:
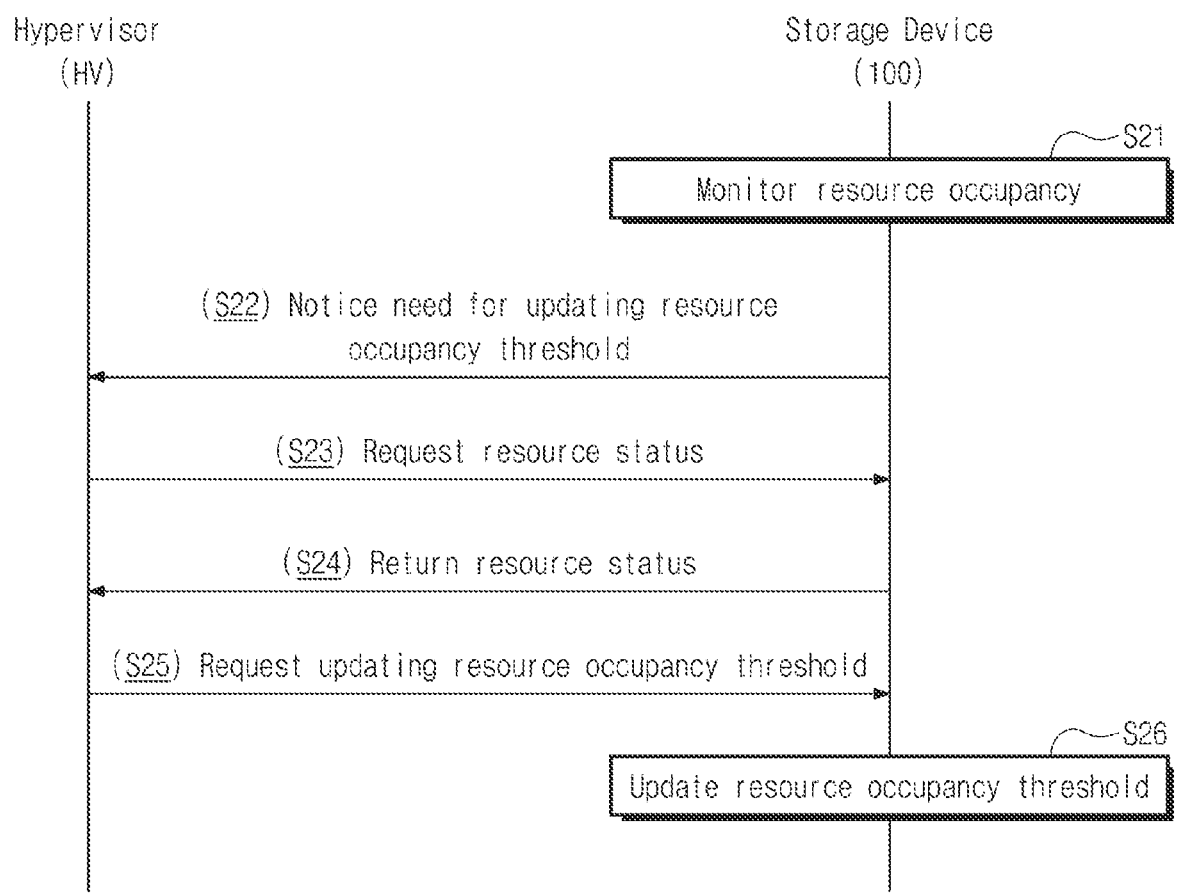
Figure 7C:
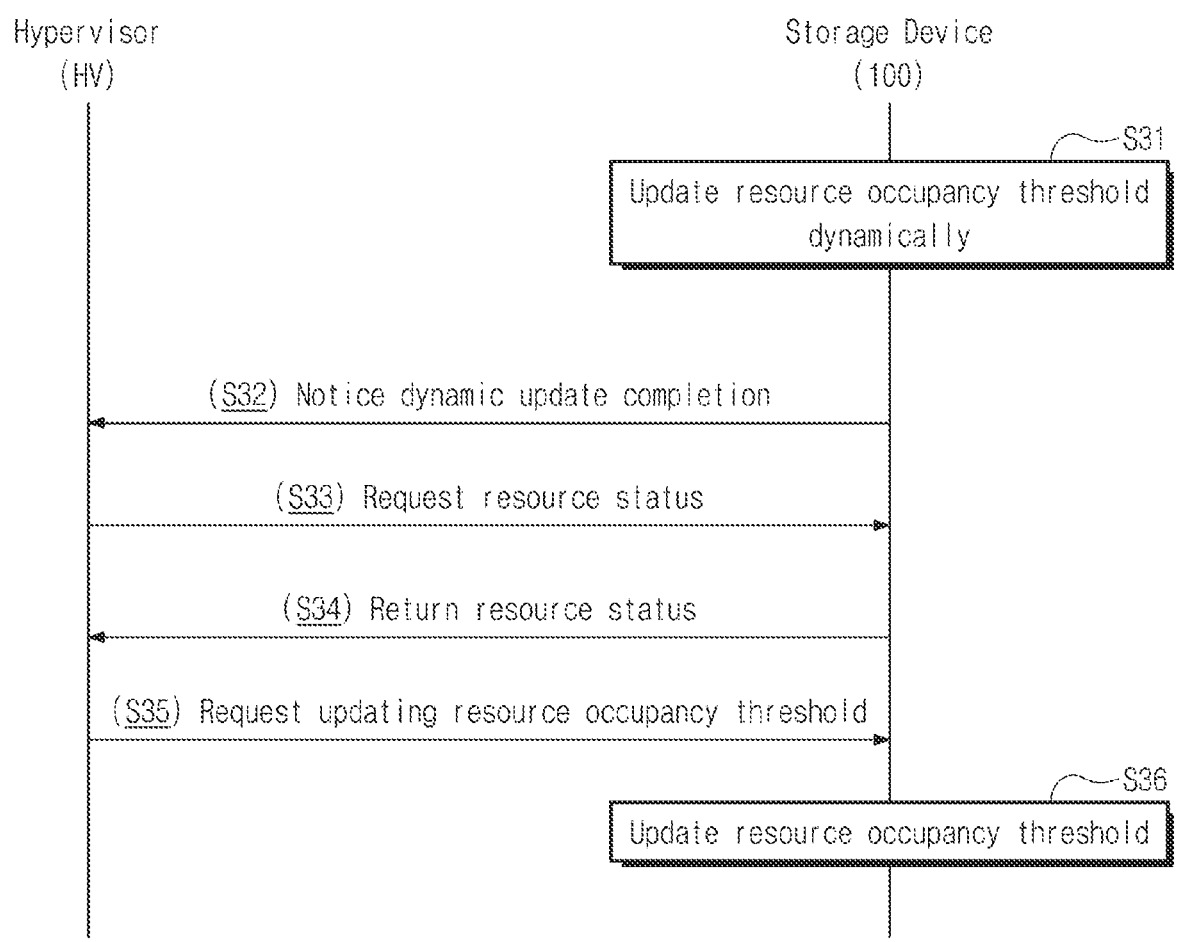

FIGS. 7A to 7C are flowcharts illustrating operations of a storage device changing a resource occupancy threshold.

Referring to FIGS. 1, 3 to 6, and 7A, the storage device 100 may update a resource occupancy threshold under control of the hypervisor HV. For example, in operation S11, the hypervisor HV may monitor the QoS of a multi-host. That is, the hypervisor HV may monitor the QoS for each of the first to n-th hosts 11 to 1n.

In operation S12, the hypervisor HV may request resource status information from the storage device 100. For example, the hypervisor HV may issue a command for requesting the resource status information. The storage device 100 may fetch the command issued by the hypervisor HV.

In operation S13, the storage device 100 may return the resource status information to the hypervisor HV. For example, the storage device 100 may return a total amount of a resource and/or a resource occupancy threshold set for each host to the hypervisor HV.

In an embodiment, the request in operation S12 may be the same as the request of the hypervisor HV described with reference to FIG. 5A. Also, the return in operation S13 may be the same as the return operation of the storage controller 110 described with reference to FIG. 5A. That is, in operation S13, the storage device 100 may return a total amount of the internal command queue ICQ and an internal command queue occupancy threshold for each host.

In operation S14, the hypervisor HV may request the storage device 100 to update the resource occupancy threshold. For example, the hypervisor HV may request the storage device 100 to change the internal command queue occupancy threshold. The operations of the hypervisor HV and the storage device 100 in operation S14 are similar to those described with reference to FIG. 5B, and thus, additional description will be omitted to avoid redundancy.

In operation S15, the storage device 100 may update the resource occupancy threshold in response to the request in operation S14. For example, the storage device 100 may change the set internal command queue occupancy threshold.

Referring to FIGS. 1, 3 to 6, and 7B, the storage device 100 may update the resource occupancy threshold under control of the hypervisor HV. For example, in operation S21, the storage device 100 may monitor the resource occupancy status. For example, the performance manager 111 of the storage device 100 may monitor the internal command queue occupancy status for each of the first to n-th hosts 11 to 1*n*. That is, the performance manager 111 may monitor the numbers of first to n-th host commands HC1 to HCn stored in the internal command queue ICQ.

In operation S22, the storage device 100 may notify the hypervisor HV that there is a need to update the resource occupancy threshold. For example, when it is determined that the internal command queue ICQ is monopolized by some hosts or when it is determined that occupancy thresholds are unnecessarily allocated to some hosts, the storage device 100 may request the hypervisor HV to change the resource occupancy threshold(s).

In operation S23 to operation S26, the hypervisor HV may check the resource status of the storage device 100 and may request the storage device 100 to update the resource occupancy threshold. The storage device 100 may update the resource occupancy threshold in response to the request of the hypervisor HV. The operations of the hypervisor HV and the storage device 100 in operation S23 to operation S26 are similar to those described with reference to FIG. 7A, and thus, additional description will be omitted to avoid redundancy.

Referring to FIGS. 1, 3 to 6, and 7C, the storage device 100 may update a resource occupancy threshold under control of the hypervisor HV.

In operation S31, the storage device 100 may dynamically change the resource occupancy threshold. For example, the storage device 100 may automatically update internal command queue occupancy thresholds respectively set for the first to n-th hosts 11 to 1*n*. An operation in which the storage device 100 dynamically changes internal command queue occupancy thresholds in operation S31 is similar to that described with reference to FIG. 6, and thus, additional description will be omitted to avoid redundancy.

In operation S32, the storage device 100 may notify the hypervisor HV that the resource occupancy threshold has been completely updated.

In operation S33 to operation S36, the hypervisor HV may check the resource status of the storage device 100 and may request the storage device 100 to update the resource occupancy threshold. The storage device 100 may update the resource occupancy threshold in response to the request of the hypervisor HV. The operations of the hypervisor HV and the storage device 100 in operation S33 to operation S36 are similar to those in operation S12 to operation S15 described with reference to FIG. 7A, and thus, additional description will be omitted to avoid redundancy.

According to an embodiment of the present disclosure, a resource occupancy threshold may be set for each of a plurality of hosts. In this case, a resource may be prevented from being monopolized by a specific host among the plurality of hosts. Accordingly, a storage device of improved performance may be provided.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An operation method of a storage device, the method comprising:
    setting a first threshold value for a first host and a second threshold value for a second host under control of a hypervisor;
    fetching host commands from the first and second hosts;
    storing the fetched host commands in an internal command queue;
    when the number of first host commands fetched from the first host, among the host commands stored in the internal command queue, reaches the first threshold value, stopping fetching a host command from the first host;
    when the number of second host commands fetched from the second host, among the host commands stored in the internal command queue, reaches the second threshold value, stopping fetching a host command from the second host; and
    when the number of first host commands stored in the internal command queue is less than the first threshold value and the number of the second host commands stored in the internal command queue is less than the second threshold value, fetching a host command from one of the first and second hosts based on a round robin manner or a weighted round robin manner.

2. The method of claim 1, further comprising:
    fetching a first command for requesting a capacity of the internal command queue and magnitudes of the first and second threshold values from the hypervisor; and
    returning information about the capacity of the internal command queue and the magnitudes of the first and second threshold values to the hypervisor in response to the first command.

3. The method of claim 2, wherein the hypervisor and the storage device are configured to communicate with each other based on a Peripheral Component Interconnect express (PCI-express) interface, and wherein the first command is a "get features" command.

4. The method of claim 1, further comprising:
fetching a second command for requesting a change of at least one of the first threshold value and the second threshold value from the hypervisor; and
changing the at least one of the first threshold value and the second threshold value in response to the second command.

5. The method of claim 4, wherein the hypervisor and the storage device are configured to communicate with each other based on a Peripheral Component Interconnect express (PCI-express) interface, and wherein the second command is a "set features" command.

6. The method of claim 1, further comprising:
monitoring the number of first host commands stored in the internal command queue at a first time point from among the first host commands fetched from the first host;
monitoring the number of first host commands stored in the internal command queue at a second time point from among the first host commands fetched from the first host; and
changing the first threshold value based on the number of the first host commands monitored at the first time point and the number of the first host commands monitored at the second time point.

7. A storage device comprising:
a nonvolatile memory device; and
a storage controller configured to control the nonvolatile memory device based on first host commands issued from a first host and second host commands issued from a second host,
wherein the storage controller includes:
a command fetcher configured to fetch the issued first and second host commands;
an internal command queue configured to store first host commands fetched from the first host and second host commands fetched from the second host; and
a performance manager,
wherein, when the number of the first host commands stored in the internal command queue is more than or equal to a first threshold value, the performance manager controls the command fetcher such that a host command is not fetched from the first host,
wherein, when the number of the second host commands stored in the internal command queue is more than or equal to a second threshold value, the performance manager controls the command fetcher such that a host command is not fetched from the second host, and
wherein, when the number of the first host commands stored in the internal command queue is less than the first threshold value and the number of the second host commands stored in the internal command queue is less than the second threshold value, the performance manager is further configured to determine an order of fetching host commands from the first and second hosts based on a round robin manner or a weighted round robin manner.

8. The storage device of claim 7, wherein the command fetcher is configured to further fetch a first command for requesting a capacity of the internal command queue and magnitudes of the first and second threshold values from a hypervisor.

9. The storage device of claim 8, wherein the hypervisor and the storage controller are configured to communicate with each other based on a Peripheral Component Interconnect express (PCI-express) interface, and wherein the first command is a "get features" command.

10. The storage device of claim 7, wherein the command fetcher is configured to further fetch a second command for requesting updating at least one of the first and second threshold values from a hypervisor.

11. The storage device of claim 10, wherein the hypervisor and the storage controller are configured to communicate with each other based on a Peripheral Component Interconnect express (PCI-express) interface, and wherein the second command is a "set features" command.

12. The storage device of claim 7, wherein the performance manager is further configured to change the first threshold value, based on the number of first host commands stored in the internal command queue at a first time point and the number of first host commands stored in the internal command queue at a second time point after the first time point.

13. A storage system comprising:
a first host;
a second host;
a storage device configured to allocate a resource to the first host in response to a request of the first host and to allocate the resource to the second host in response to a request of the second host; and
a hypervisor configured to access the storage device to control the resource allocation to the first and second hosts,
wherein the storage device is configured to:
set a first threshold value for an amount of the resource allocated to the first host and a second threshold value for an amount of the resource allocated to the second host under control of the hypervisor;
stop the resource allocation to the first host when the amount of the resource allocated to the first host reaches the first threshold value; and
stop the resource allocation to the second host when the amount of the resource allocated to the second host is greater than or equal to the second threshold value,
wherein the resource includes at least one of a nonvolatile memory space, a volatile memory space, and an internal command queue.

14. The storage system of claim 13, wherein the storage device is further configured to: monitor an amount of the resource allocated to the first host at a first time point and an amount of the resource allocated to the first host at a second time point; and update the first threshold value based on the monitored amount of the resource allocated to the first host at the first time point and the monitored amount of the resource allocated to the first host at the second time point.

15. The storage system of claim 13, wherein the storage device is configured to:
when the amount of the resource allocated to the first host is smaller than the first threshold value and the amount of the resource allocated to the second host is smaller than the second threshold value, allocate the resource based on one of a round robin manner or a weighted round robin manner.

16. The storage system of claim 13, wherein the storage device is configured to:
return information about a total amount of the resource and the first and second threshold values in response to a request of the hypervisor.

17. The storage system of claim 13, wherein the storage device is configured to:
update the first and second threshold values in response to a request of the hypervisor.

* * * * *